United States Patent [19]

Spratt

[11] 4,394,283

[45] Jul. 19, 1983

[54] STABLE ICE RELEASE AGENT

[76] Inventor: Lorenzo Spratt, P.O. Box 41138, Dallas, Tex. 75241

[21] Appl. No.: 255,524

[22] Filed: Apr. 20, 1981

[51] Int. Cl.³ .............................................. C09K 3/18
[52] U.S. Cl. ...................................... 252/70; 106/13
[58] Field of Search ........................... 252/70; 106/13

[56] References Cited

U.S. PATENT DOCUMENTS

| 2,346,891 | 4/1944 | Adlington | 106/13 X |
|---|---|---|---|
| 2,372,171 | 3/1945 | Bennett | 106/13 |
| 2,812,264 | 11/1957 | Goms | 106/13 |
| 3,096,290 | 7/1963 | Duane et al. | 252/70 |
| 3,362,909 | 1/1968 | Georgal et al. | 252/70 |
| 3,756,956 | 9/1973 | Panusch | 252/70 |
| 3,763,071 | 10/1973 | Katzer et al. | 260/29.6 E |
| 3,865,619 | 2/1975 | Pennewiss et al. | 117/138.8 |
| 3,929,699 | 12/1975 | Bernholz | 252/70 X |
| 3,940,356 | 2/1976 | Brynes | 260/29.6 E |
| 3,950,289 | 4/1976 | D'Amoto | 252/70 X |
| 4,278,570 | 7/1981 | Flom | 252/546 |
| 4,283,297 | 8/1981 | Peters | 252/70 |

FOREIGN PATENT DOCUMENTS 54-35187  3/1979  Japan ................................ 106/13

Primary Examiner—Dennis L. Albrecht
Attorney, Agent, or Firm—Dennis T. Griggs

[57] ABSTRACT

An aerosol foam composition for inhibiting the bonding of ice precipitates to a substrate comprises propylene glycol mixed with propylene glycol monostearate. The composition is preferably dispensed by spraying from a sealed container which is pressurized by a propellant.

5 Claims, 1 Drawing Figure

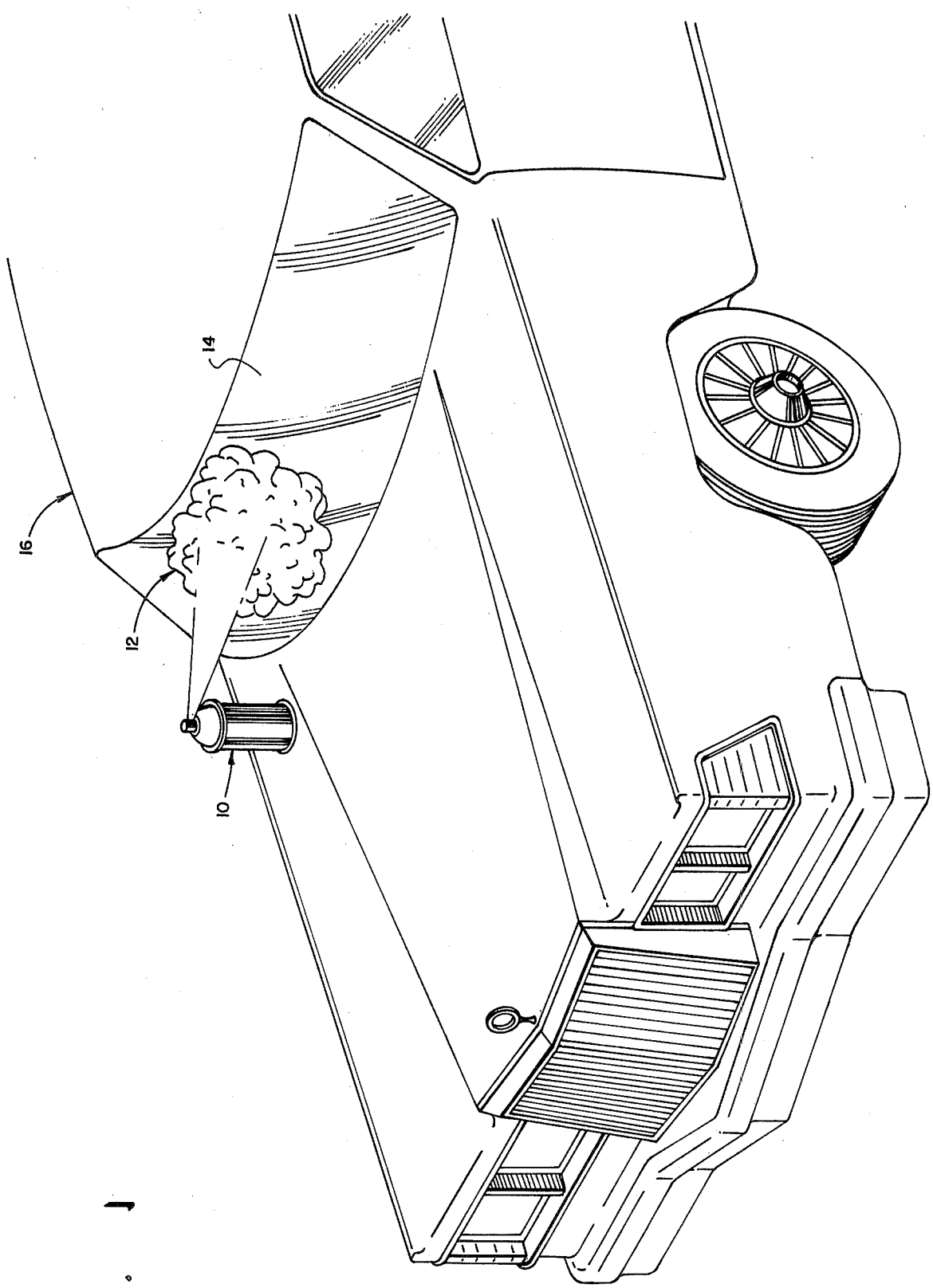

STABLE ICE RELEASE AGENT

BACKGROUND OF THE INVENTION

1. Field of the Invention

This invention relates to ice release agents for inhibiting the bonding of ice precipitates to a substrate, and in particular, to a non-toxic ice release composition which is stable and insoluble in water.

2. Description of the Prior Art

The bonding or adhesion of ice precipitates to unprotected vehicles, equipment and exposed structures is a common problem inasmuch as the ice or frost accumulation limits the utility of the equipment and shortens its useful life. Some equipment or vehicles cannot be garaged and are exposed to ice formation for long periods of time. A common occurence of ice precipitation is ice formation on automobile windshields and door panels. A considerable amount of time and effort must be expended to remove the ice so that the door can be opened and the automobile operated safely with good visibility through the windshield. Ice formation is also a problem in other areas where equipment is left unprotected or otherwise exposed to the elements, for example outdoor machinery such as electrical motors, compressors and the like, earth moving machinery, building structures, sidewalks and driveways. The removal of the accumulated ice precipitates from such equipment and structures in a serious and continuing problem which involves considerable time and expenditure.

Among the solutions which have been attempted to solve the ice accumulation problem are methods which remove existing accumulations of ice by melting the ice, methods that utilize a permanent ice release coating on the surface of the structure to be protected, and methods that involve the use of a temporary ice release coating on the surface of the structure.

The use of temporary release agents, while being both practical and economical, has been limited because the film thickness of the ice release agent has been too thin to prevent the bonding of ice precipitates on non-horizontal surfaces such as the windshield of an automobile. Moreover, the duration of protection for such ice release agents has been limited because of the relatively rapid evaporation rate of the formulation. The effectiveness of water-soluble ice release compositions has also been limited by the tendency to be rapidly diluted when contacted by the ice precipitates.

Conventional ice release compositions have been characterized by relatively low viscosity which causes them to drain away from non-horizontal surfaces thereby leaving an insufficient amount of the composition to provide an effective release layer. Other release compositions are toxic and thus may be used only under controlled conditions.

OBJECTS OF THE INVENTION

It is, therefore, the principal object of the present invention to provide a temporary ice release agent which will remain in a relatively stable layer without drainage when applied to a non-horizontal surface.

A related object of this invention is to provide an effective ice release composition which is water-miscible.

Another object of this invention is to provide an effective ice release composition which is non-toxic.

Yet another object of this invention is to provide an ice release agent which can be dispensed from the release valve of a sealed container which has been pressurized by a propellant.

Still another object of the invention is to provide an ice release composition having a low viscosity when pressurized and also have the ability to maintain a stable thickness when sprayed onto non-horizontal surfaces.

SUMMARY OF THE INVENTION

A release composition has been developed which is effective for inhibiting the bonding of ice precipitates to a non-horizontal substrate which comprises propylene glycol mixed with a fatty acid such as stearic acid, preferably propylene glycol monostearate. The release composition is preferably dispensed through a spray valve of a sealed container which is pressurized by a propellant. The mixture of the propylene glycol and propylene glycol monostearate produces an anhydrous emulsion having a relatively low viscosity in solution under pressure, and which produces a relatively stable foam or gel when sprayed against a substrate.

In a preferred embodiment, the ice release composition comprises an aqueous mixture of propylene glycol and water in a glycol:water ratio of about 20:80 to about 90:10, and 0.5 to about 1 part of propylene glycol monostearate per one hundred parts of the propylene glycol/water mixture. When delivered from a spray can, a propellant is present in about two parts by weight to every one hundred parts of the active mixture.

The novel features which characterize the invention are defined by the appended claims. The foregoing and other objects, advantages and features of the invention will hereinafter appear, and for purposes of illustration of the invention, but not of limitation, an exemplary embodiment of the invention is shown in the appended drawing.

BRIEF DESCRIPTION OF THE DRAWING

The sole FIGURE of the drawing illustrates the application of an ice release composition by spray delivery against the windshield of an automobile.

DETAILED DESCRIPTION OF THE INVENTION

To be effective, the ice release composition must adhere to a non-horizontal substrate, such as the windshield of an automobile as illustrated in FIG. 1. Low viscosity liquid phase release agents, when applied to a non-horizontal substrate, will leave a thin film after running off under the influence of gravity. Thus, the ice release composition must be modified to a foam which will adhere in a stable layer onto a non-horizontal surface. This is achieved in the present invention by combining propylene glycol with propylene glycol monostearate to form a low viscosity mixture, which when discharged under pressure, sets up as a stable foam or gel which is water-miscible.

The invention is illustrated by the following example in which the specifications are based on the total weight of the composition unless otherwise specified.

EXAMPLE 1

The following formulation was compounded:
Propylene glycol—87 parts
Deionized H$_2$O—10 parts
Propylene glycol monostearate—1 part
A-70 hydrocarbon propellant—2 parts Application of the foregoing compounded formulation was by spraying onto dry and wet glass plates. The foam layer was stable on the glass plates for 48 hours at ambient temperatures in the range of 45° F.-70° F. The same glass plates with the applied foam were then sprayed with atomized water and placed in a freezer chest at −25° F. in a vertical position. The applied foam treatment did not freeze and showed reasonable foam stability at the end of 72 hours. The sprayed atomized water formed a slightly stiffened coating on top of the foam. The entire layers of foam and frozen water were easily removed by a brush, paper towel and by a windshield scraper. The above-mentioned tests were performed with the aqueous composition and the anhydrous composition, with no significant differences.

EXAMPLE 2

The following composition was compounded:
Propylene glycol—90 parts
Propylene glycol monostearate—1 part
A-70 hydrocarbon propellant—9 parts The foregoing propylene glycol/monostearate composition was applied as an anhydrous emulsion in a cannister 10 as illustrated in FIG. 1. The cannister was pressurized with A-70 hydrocarbon propellant. The aqueous emulsion was pressurized at 66 psig at 70° F. The anhydrous emulsion was pressurized at 70 psig at 70° F. A white stable foam 12 was sprayed onto the windshield 14 of an automobile 16 as illustrated in FIG. 1. The white stable foam was delivered in a light layer with an eight inch fan spray pattern from a distance of eighteen inches in each case.

The delivery rate for the aqueous emulsion (EXAMPLE 1) was 3.1 grams per second, while the delivery rate of the anhydrous emulsion (EXAMPLE 2) was slightly greater at 3.5 grams per second. Both emulsions produced a stable, white foam layer which was easily removed with a windshield scraper. Additionally, both compositions were easily removed with a high pressure water spray.

Although a preferred embodiment of the invention has been described in detail, it should be understood that various changes, substitutions and alterations can be made therein without departing from the spirit and scope of the invention as defined by the appended claims.

What is claimed is:

1. In a pressurized container which is provided with a spray valve, an ice release composition consisting of propylene glycol mixed with propylene glycol monostearate and water and a propellant.

2. The combination as defined in claim 1, said ice release composition including de-ionized water.

3. A method for inhibiting the bonding of ice precipitates to a substrate comprising the step of applying directly to the substrate a layer of an ice release composition consisting of propylene glycol mixed with propylene glycol monostearate and water wherein said ice release composition is applied to said substrate from a pressurized sealed container which contains said ice release composition and a propellant.

4. The ice release composition of claim 1 wherein the ratio of glycol to water is in the range of about 20:80 to about 90:10.

5. The ice release composition of claim 1 wherein the ratio of propylene glycol monostearate to the propylene glycol water mixture is in the range of about 0.5:100 to about 1:100.

* * * * *